Nov. 23, 1965     G. MONTICELLI     3,218,956
APPLIANCE FOR THE QUICK AND RATIONAL
PREPARATION OF A COFFEE BEVERAGE
Filed Oct. 15, 1962     2 Sheets-Sheet 1
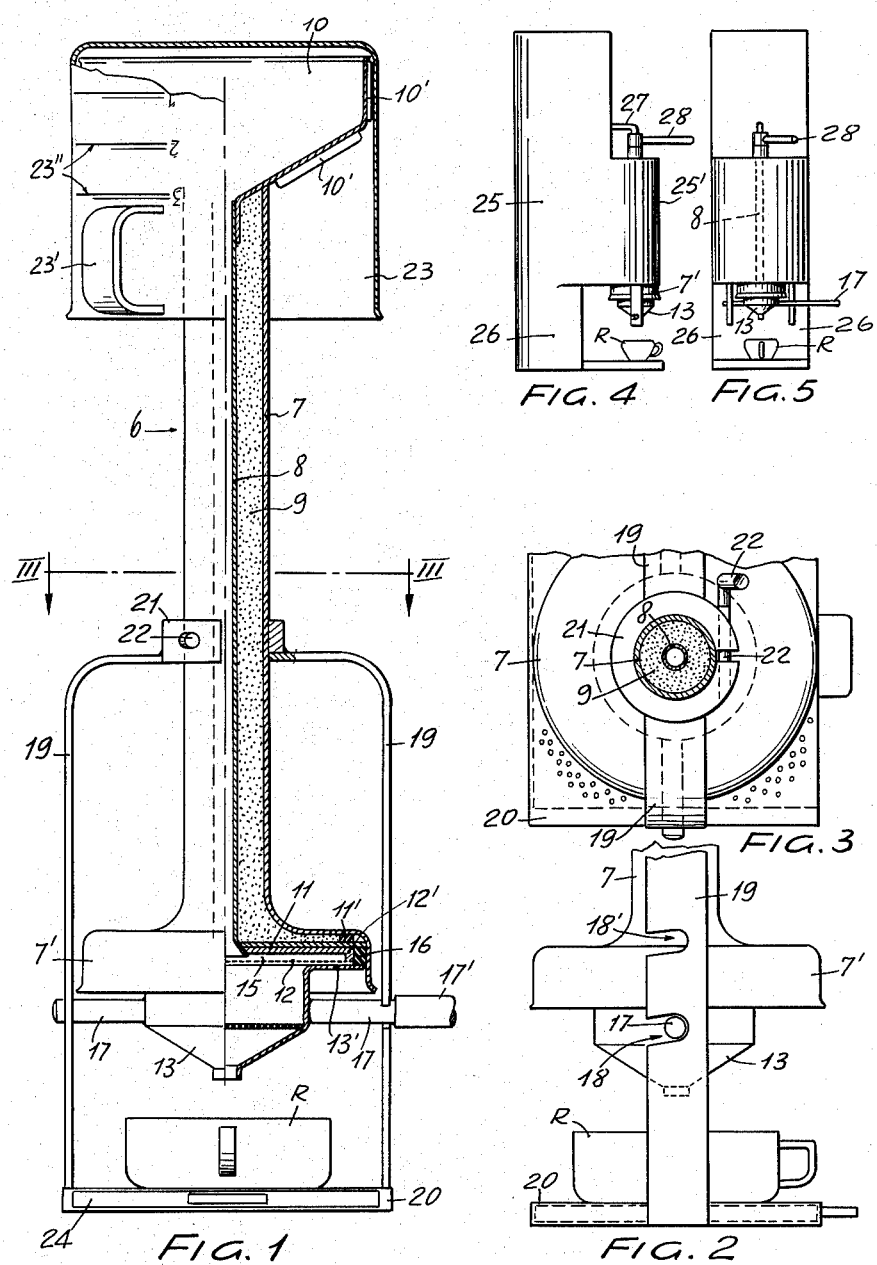
INVENTOR
GIULIO MONTICELLI
BY *Irvin S. Thompson*
ATTORNEY Nov. 23, 1965 G. MONTICELLI 3,218,956
APPLIANCE FOR THE QUICK AND RATIONAL
PREPARATION OF A COFFEE BEVERAGE
Filed Oct. 15, 1962 2 Sheets-Sheet 2
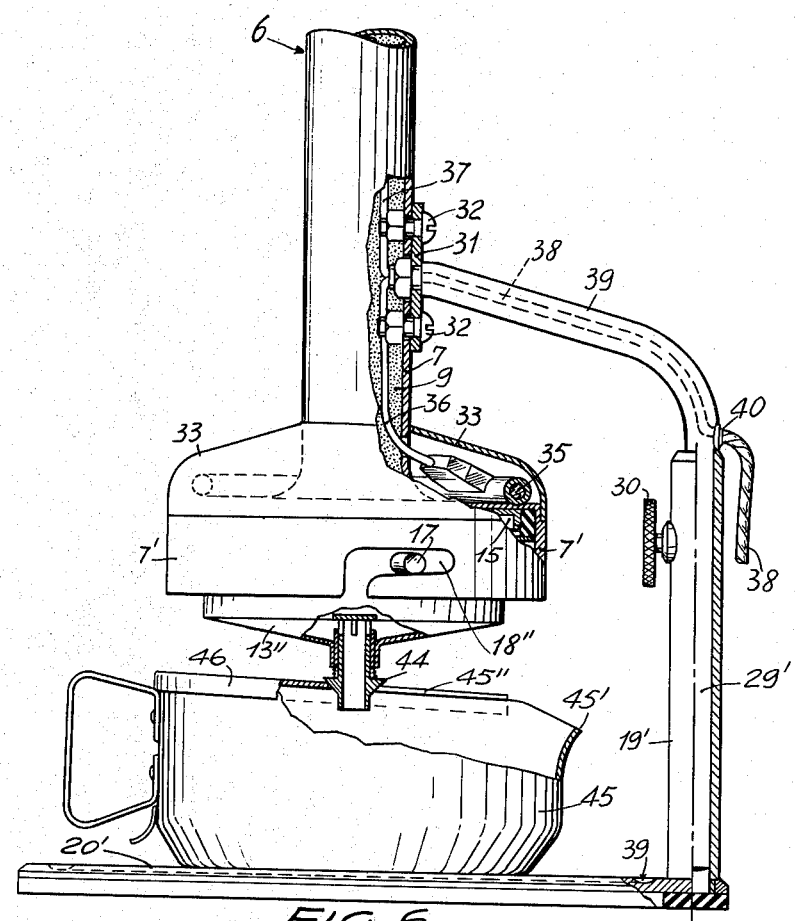
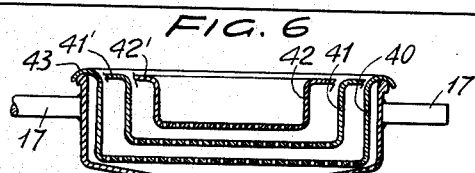
INVENTOR
GIULIO MONTICELLI
BY
ATTORNEY United States Patent Office 3,218,956
Patented Nov. 23, 1965

3,218,956
APPLIANCE FOR THE QUICK AND RATIONAL PREPARATION OF A COFFEE BEVERAGE
Giulio Monticelli, Via Savona 134, Milan, Italy
Filed Oct. 15, 1962, Ser. No. 230,389
Claims priority, application Italy, Oct. 20, 1961, Patent 658,271; Jan. 24, 1962, 1,452/62
4 Claims. (Cl. 99—302)

Coffee beverage is generally prepared in public restaurants and the like with appliances utilizing the pressure generated by steam, or by springs to aid and accelerate the percolation of the hot water through a layer of ground coffee.

Such a beverage is also prepared, especially for home consumption without the help of definite pressures and at variable temperatures, wherefore the preparation of the beverage is slow and faulty.

For this home use there are produced appliances of different sizes, each of which is constructed for preparing a certain definite quantity of beverage. It is therefore impossible to prepare simultaneously, with a single operation, 6 cups of coffee with an appliance designed for instance for preparing two cups only.

Further, these home appliances have to be cooled, disassembled, washed, and reassembled after each operation.

It is an object of the present invention to simplify and improve the preparation of the beverage by operating at a definite temperature, equal to, or slightly less than 100° C., and aiding the percolation of the hot water by means of the definite and constant pressure of a predetermined water column.

It is a further object of the present invention to prepare one or more cups of coffee, using a single appliance and varying only the container of the ground coffee, and consequently the receiving container. Accordingly the ground coffee container is the only accessory that has to be handled, and eventually changed, even for the appliances for home use.

The appliance according to the invention comprises a vertical small diameter pipe, (for instance from 1 to 5 millimeters), of appropriate length, that may vary preferably but not exclusively from about 10 to 20 times the thickness of the ground coffee layer placed in the percolating container, and terminating at its upper end with a funnel-shaped cup, and mouthing at its lower end in a widened chamber of minimum height, upwardly limited by a wall parallel to the percolator surface, that serves to assure the hot water distribution over the underlying coffee powder. Against the peripheral rim of said chamber there is made to adhere by pressure the ground coffee container, provided with an outer diametrical rod, serving to fix it against said widened chamber and, at the same time, serving as a handle. The fixing method is realized by means of two uprights, fast at their lower ends with a base, and carrying upwardly, by means of a sleeve, the cylindrical shell that covers and contains the thermic insulation surrounding the small pipe.

Referring to the attached drawing there will now be described, by way of example, two forms of embodiment of the appliance according to the present invention.

FIGURE 1 shows a front view of a first form of embodiment of the complete appliance, half of which is vertically sectioned.

FIGURE 2 represents a partial view of the lower portion of FIGURE 1, rotated by 90°.

FIGURE 3 is a section on the line III—III of FIGURE 1.

FIGURES 4 and 5 represent respectively a side and a front view of an appliance according to the invention, incorporated in a boiler.

FIGURE 6 shows a lateral view, partially sectioned, of a second embodiment of the invention, and FIGURE 7 represents a vertical section of the set of percolators of decreasing sizes.

Referring to the drawings, and particularly to FIGURE 1, the vertical column 6 comprises an outer shell 7, and an inner small pipe 8, which is the main part of the invention; the hollow space 9 is filled with an appropriate insulating material. At its upper end, the small pipe 8 is connected fast with a cup 10, in the shape of a funnel, and which can be fast also with the shell 7. At its lower end, the small pipe 8 is fast with the disc 11. The small pipe 8, having a predetermined diameter and height, as it will be stated below, serves to deliver the water, poured in 10, to the underlaying percolator, and to generate a pressure, defined according to the pipe height; this in order to limit to the strictly necessary the percolation of the water through the ground coffee, and to obtain a perfect, aromatic beverage, free from bad flavours traceable to the excessive permanence of the water in contact with the ground coffee. Indeed, the peripheral flanged edge 12' of the disc 11 terminates over the perforated disc 12, with which it may be fast or not, forming a chamber 15 of minimum height that allows to evenly distribute the water on the percolator or container 13, for the ground coffee, while the height of the small pipe 8 establishes the hydrostatic head and fixes the percolation speed of the water through the powered coffee.

The disc 11 is thermically insulated from the shell 7 that, at its lower end, spreads out in the shape of a bell 7', and is spaced from the shell by the gasket 11'. A second gasket 16 is clamped between the edge 12' of said disc 11, and the lateral wall of the bell 7', and protrudes downwardly in order to make a tight seal against the flange 13' of the container 13, which furthermore is fast with two transverse rods 17, whose ends engage on the uprights 19, and one of which extends in a handle 17'. Said rods 17 are adapted to make engagement within the notches 18, opening in opposite directions, and provided on the uprights 19, rigidly welded on the base 20, and converging upwardly in a split ring or sleeve 21, with which they are fast.

The column 6 is carried by the ring 21 and is made fast to it by means of the hand actuated screw 22; the column 6 may be made to slide vertically in order to make room, between the base 20 and the delivery outlet 13, for containers of different capacities. To this end, on the uprights 19 there are provided notches 18', to be used in the different positions of the column 6.

It is further to be noted that the percolating container 13 may have different diameters and heights, so as to contain doses for 1, 2, 3 or more cups of coffee, and that its flange 13' has an outer constant diameter, while its peripherical flange width varies inversely to the diameter of the percolating container, so that a single and same appliance may use different capacity percolators, which however will all be adaptable to the lower perforated portion 12 of the chamber 15.

With regard to what has been said above, the appliance is provided with a tumbler 23; which, in FIGURE 1, is represented upside-down and slipped over the funnel-shaped cup 10, in a position of the appliance when not in use; said tumbler 23, provided with a handle 23', is indexed transversely as in 23", to show the water volume required for 1, 2, 3 etc. doses of coffee, and is thus used to pour the necessary quantity of boiling water in the funnel 10.

It is further to be noted that the base 20 can be provided with a small drawer, extending through same, to collect the drip.

The appliance, as described above and illustrated in the FIGURES 1, 2 and 3, is designed for home use. However, it can be adapted for use in bars and the like, its essential features remaining unchanged.

In FIGURES 4 and 5 there is represented a practical solution of such an adaptation; indeed, there can be provided a boiler 25, carried by the column 26, inside which can find place a source of heat to warm the water contained in the boiler 25. The front portion 25' of said boiler shall have practically the same height as the small pipe 8, that may be imbedded therein; said small pipe 8 is provided at its lower end with the bell 7', and its inner elements, inherent thereto, and is supplied through the upper conduit 27 coming from the boiler, with the interposition of a valve controlled by the handle 28.

A variant of the device shown in FIGURE 1 may be provided by applying to the base of the funnel 10 a heat source, as for instance an ironclad ribbon resistor 10', adhering to the funnel wall 10 for heating the water retained by a valve, applied in any whatever position of the small pipe 8, and actuable when the water has reached the required temperature.

The preparation of the beverage takes place as follows:

The container 13 is filled with ground coffee and the container is threaded into the bell 7', engaging the small rods 17 within their respective notches 18, on the uprights 19.

There is poured in the funnel-like cup 10, by means of the tumbler 23, a quantity of boiling water corresponding to the quantity of ground coffee used, and the tumbler is then placed under the delivery beak of the container 13.

The percolated beverage is collected in the underlying tumbler 23 or in another container R, taking away which the residual drops of coffee, corresponding to the volume of part of the small pipe 8 and of the chamber 15, that is a very negligible quantity, will fall in the drawer 24. FIGURE 6 shows a second form of embodiment wherein the filtering head and the small pipe are assembled jutting from a bracket 29 on the single upright in the shape of a hollow column 19'. The appliance rests on the plane with its base 20', provided on its upper side with an annular groove 39, having a section shaped as an arc of a circle, to collect the moisture. With said base 20' there is fast the hollow column 19', wherein can slide in height the vertical stem 29' of the arm 29, foreseen to carry the vertical column 6, to this end, the arm 29 is made fast to the outer wall 7 of said column 6, through the plate 31 and the screws 32, that may be substituted by spot-welds. The displacements in height of the arm 29 are determined by the set screw 30, provided on the small column 19'.

The outer wall 7 of the column 6, spreads out at its lower end to form the bell 7', and on its periphery, there are provided the diametrically opposite notches 18" for the bayonet jointing of the rod 17 fast to the percolating container 13.

On the upper side of said bell 7', there can be provided an annular electric resistor 35 for heating the chamber 15. The resistor may be protected by the cover 33, slidable on the column 6, and fitting downwardly under a slight pressure, on a seat peripherically provided on the bell 7'. Said resistor 35 will be supplied from a cable 36 that, in correspondence to the arm 29, is connected in parallel with the cable 37, supplying the upper resistor 10' of the funnel 10. The single cable 38, running inside the upper portion of the arm 29, comes out in a point 40 thereof above the small column 19' so as to assure an effective distance between said cable 38 and any wet parts and members that have to be handled. Along the path of the cable 38 there can be installed a switch, to cut off the appliance from the circuit, without having to pull out the plug. Further, in a visible position of the appliance, there will be mounted a signal lamp to show when the appliance is in operation. There can be also provided a thermostat to prevent exceeding a predetermined temperature. The thermostat may eventually control a cock or valve to open the water conduit of the supply reservoir 10, to the bell 7'.

It is further pointed out that the small pipe 8 for the gravity feed of the water may be substituted by a plurality of small pipes bundled together or arranged in any other way, and operating in the way of a shower. Between these two embodiments there are naturally foreseen all the intermediate ones, comprising two, three or more smal pipes or passages having openings of an annular or polygonal section.

In the form of embodiment of FIGURE 6, there has been introduced an improvement, in respect to the forms of FIGURES 1 to 3, as far as the collection of the infusion is concerned, in order to avoid any drippings. To this end the delivery beak of the percolating container 13, or of an outer percolator carrier 13", terminates with a spring loaded valve 44, closing the orifice when in the rest position. The orifice is opened by exercising a pressure upwardly from the bottom and this pressure is imparted by the collecting container 45, that is provided with a beak 45' having a slanted edge, so as to reach under the valve 44 thanks to a tapered guiding groove 45" foreseen in the cover 46 of said container 45, and to lift it at the end of its stroke, thereby obtaining the opening of the valve, and the delivery of the infusion in the container 45.

When the container 45 is retrieved, the valve 44 closes and the beak of the container serves as a shaver to prevent the falling even of the last drop.

This form of embodiment has the further advantage to keep the collecting container 45 well centered and fixed under the delivery head, without danger that it may be displaced or fall, what is particularly useful during the transportation of the appliance.

In FIGURE 7 there is shown another variant to the main patent and namely the percolating container 13 is substituted by a percolator carrier 13', having preferably a maximum size; said carrier is entirely hollow and apt to receive a set of interchangeable percolating containers 40, 41, 42 each having a specific capacity.

Said percolators 40, 41, 42 are provided with an upper flange 41', 42', for the smaller sizes, while all are provided with a flange having a concave rim 43, facing downwards, so as to rest on the upper supporting edge of the percolators carrier 13'. The operation of the appliance according to FIGURE 6 is identical with that of FIGURES 1 to 3.

It is obvious that particular changes and modifications may be made on the parts or elements described above, without departing from the field and scope of the present invention.

What I claim is:

1. An appliance for the quick preparation of coffee infusion comprising in combination:
   a funnel-shaped cup for containing hot coffee infusion water;
   a long, narrow, vertical, tubular blowoff conduit having an inside diameter of approximately 3 millimeters connected to said cup;
   an outer shell coaxial with said blowoff conduit having an upper end abutting said cup and a widened bell-shaped lower end;
   a flat chamber within said bell-shaped lower end, said flat chamber defined by an upper annular disc integral with said blowoff conduit, a lower perforated disc acting as a distributor, an annular spacer between said discs, a peripheral gasket clamped about said upper annular disc and abutting said bell-shaped lower end;
   a cylindrical percolator having a flat perforated bottom, a peripheral wall defining the maximum ground coffee height, a peripheral flange supporting said perforated disc, and a lower blowoff funnel;
   said flat chamber having a height of less than approximately one quarter of said maximum ground coffee height;

said blowoff conduit having a height greater than approximately 15 times said maximum ground coffee height; and said blowoff conduit connecting said funnel-shaped cup and said cylindrical percolator whereby a substantially constant hydrostatic pressure is produced on ground coffee until water contained in said funnel-shaped cup is exhausted.

2. An appliance for the quick preparation of coffee infusion comprising in combination:
a funnel-shaped cup for containing hot coffee infusion water;
a long, narrow, vertical, tubular blowoff conduit having an inside diameter of approximately 3 millimeters connected to said cup;
an outer shell coaxial with said blowoff conduit having an upper end abutting said cup and a widened bell-shaped lower end;
a flat chamber within said bell-shaped lower end, said flat chamber defined by an upper annular disc integral with said blowoff conduit, a lower perforated disc acting as a distributor, an annular spacer between said discs, a peripheral gasket clamped about said upper annular disc and abutting said bell-shaped lower end;
a cylindrical percolator having a flat perforated bottom, a peripheral wall defining the maximum ground coffee height, a peripheral flange supporting said perforated disc, and a lower blowoff funnel having an orifice;
said flat chamber having a height of less than approximately one quarter of said maximum ground coffee height;
said blowoff conduit having a height greater than approximately 15 times said maximum ground coffee height;
said blowoff conduit connecting said funnel-shaped cup and said cylindrical percolator whereby a substantially constant hydrostatic pressure is produced on ground coffee until water contained in said funnel-shaped cup is exhausted;
valve means terminating said orifice defined by a hollow piston valve and a spring compressing said piston in an ejected position; and
a gathering cup provided with a top cover having a radial groove opening with tapered sides cooperative with said piston, said top cover having an inclined plane beak whereby said piston in an ejected position is compressed to a retracted open valve position by insertion of said piston in said radial groove opening.

3. An appliance for the quick preparation of coffee infusion comprising in combination a funnel-shaped cup for containing hot coffee infusion water, a long narrow vertical tubular conduit connected to and depending from said cup, an outer shell coaxial with said conduit having an upper end abutting said cup and a widened lower end in the form of a downwardly opening bell terminating in a downwardly depending flange, a horizontal upper annular disc surrounding and secured to the lower end of said conduit within said bell, a lower horizontal perforated disc within said bell and acting as a distributor, a horizontal annular spacer between said discs and defining with said discs a chamber at least several times wider than it is high, a peripheral gasket disposed outside of said annular spacer and inside of said flange of said bell and in sealing relationship between said spacer and said bell, said flange extending downwardly below said gasket, a percolator having a perforated bottom, and a peripheral wall upstanding from said bottom, said gasket resting removably on a portion of said wall.

4. An appliance as claimed in claim 3, said gasket extending downwardly below said perforated disc, said portion of said peripheral wall comprising a radially outwardly extending horizontal flange on which said gasket rests.

References Cited by the Examiner

UNITED STATES PATENTS

| 548,940 | 10/1895 | Wilda | 99—304 |
| 1,473,898 | 11/1923 | Bossini | 99—302 X |
| 1,830,000 | 11/1931 | Miller et al. | 99—302 |
| 2,245,389 | 6/1941 | Cremer | 99—305 |

FOREIGN PATENTS

| 562,669 | 9/1923 | France. |
| 211,063 | 2/1924 | Great Britain. |
| 585,904 | 11/1958 | Italy. |

ROBERT E. PULFREY, *Primary Examiner.*

JEROME SCHNALL, WILLIAM B. PENN, *Examiners.*